United States Patent [19]

Matsuura et al.

[11] Patent Number: 5,185,563
[45] Date of Patent: Feb. 9, 1993

[54] ERROR DETECTING UNIT FOR A ROTATIONAL DETECTOR

[76] Inventors: Yasumasa Matsuura, 19-1016, 1-ban, 2-chome, Takasu-cho, Nishinomiya-shi, Hyogo; Hiroyuki Harada, 3-36, 2-cho, Shinonomenishi-mati, Sakai-shi, Osaka; Tetsuji Kajitani, 202-8, Aza-Nora, Higashitada, Kawanishi-shi, Hyogo; Toshihiko Araki, 9-11-24, Suzurandaihigashi-mati, Kita-ku, Kobe-shi, Hyogo, all of Japan

[21] Appl. No.: 601,505

[22] Filed: Oct. 23, 1990

[30] Foreign Application Priority Data

Oct. 24, 1989 [JP] Japan ................... 1-277772

[51] Int. Cl.⁵ ............................................. H03K 5/19
[52] U.S. Cl. ................................... 318/602; 328/120
[58] Field of Search ............... 318/600, 601, 602, 603, 318/661; 364/167.01; 340/825.56; 377/30; 307/514, 515; 328/120; 341/1, 6, 11

[56] References Cited

U.S. PATENT DOCUMENTS

| | | | |
|---|---|---|---|
| 3,843,915 | 10/1974 | Helmbold | 318/602 |
| 4,266,215 | 5/1981 | Adams | 341/6 |
| 4,442,532 | 4/1984 | Takemura | 377/3 |
| 4,558,304 | 12/1985 | Wand | 318/661 X |
| 4,578,748 | 3/1986 | Abe et al. | 364/167 |
| 4,591,969 | 5/1986 | Bloom et al. | 318/603 X |
| 4,845,379 | 7/1986 | Carlsten | 328/120 |
| 4,882,529 | 11/1989 | Kobari et al. | 318/602 |
| 5,014,801 | 5/1991 | Hirose | 180/140 |

*Primary Examiner*—Bentsu Ro
*Attorney, Agent, or Firm*—Roper & Quigg

[57] ABSTRACT

An error detecting unit for a rotational detector which outputs two kinds of pulse signals whose frequency according to rotation is equal and whose phase is different including counters for detecting whether or not either a rising or a falling edge of the two kinds of pulse signals appears alternately so as to detect an error of the corresponding rotational detector.

3 Claims, 4 Drawing Sheets

DIRECTION OF THE COUNTERCLOCKWISE ROTATION (CCW)

(k)　　( )

DIRECTION OF THE CLOCKWISE ROTATION (CW)

(m)　　(n)

ERROR DETECTING UNIT FOR A ROTATIONAL DETECTOR

BACKGROUND OF THE INVENTION

1. Field of the invention

The present invention relates to an error detecting unit of a rotational detector such as an encoder, and particular to an error detecting unit of a rotational detector, by which an error of the rotational detector can be securely detected without fail.

2. Description of the Prior Art

Generally, a rotational detector such as an encoder is attached to a rotary body (for instance, a motor), and it can output two kinds of pulse signals (A and B) having phase difference (for instance 90 degrees) and equal frequency according to rotation of the rotary body.

FIG. 4 and FIG. 5 illustrate one of the examples of the pulse signals A and B as utilizing a time chart, and these Figures respectively show the state of pulse signals when the motor rotates counterclockwise (hereinafter called "CCW direction") or clockwise (hereinafter called "CW direction").

Generally, the actual direction (CCW direction or CW direction) of rotation of the motor can be distinguished by difference of the level (Low and High) of the pulse signal B at the times (k), (l) in FIG. 4 and at the times (m), (n) in FIG. 5 when the first transition of the pulse signal A occurs.

Usually, the direction by a command of the direction of rotation of the motor is coincident with the actual direction of rotation. However, in the case of the system in which the motor is given reverse driving force by changing a command of direction of rotation in changing the direction of rotation of the motor or braking, the direction of rotation by a command of the direction of rotation in changing the direction of rotation or braking the motor is reverse of the actual direction of rotation thereof.

It has been known that, as an error detecting method of the rotational detector, such a method that can determine that the rotational detector is out of order when the direction by a command of the direction of rotation of the motor is not coincident with the actual direction of rotation of the motor at other time than in changing the direction of rotation or braking as shown in the above.

Hereupon, there are many cases that the error of the rotational detector is a short-circuit, breakage of wire, etc. of a signal transmission channel. In these cases, the above pulse signal (A or B) remains as it is at low level or high level.

FIG. 6, using a time chart, shows an example that the pulse signal B is kept at low level as one of the examples of error.

In this case, it is determined that the actual direction of rotation of the motor is usually CCW direction.

Therefore, according to the conventional error detecting method for the rotational detector, in the case that the direction by the command of direction of rotation is CW direction, it is possible to detect the above error. However, in the case that the direction by the command of direction of rotation is CCW direction, such an error as shown in the above can not be detected. For this reason, an error of the rotational detector could not be reliably detected by the conventional error detecting method as shown in the above.

SUMMARY OF THE INVENTION

The present invention has been made to overcome the points of problem in the prior art.

It is therefore an object of the invention to provide an error detecting unit of a rotational detector, by which short circuit, breakage of wire, etc. which occupy a large part of the causes of errors of the rotational detector can be securely detected without fail.

That is, the invention provides an error detecting unit of a rotational detector for outputting two kinds of pulse signals of which frequency according to rotation is equal, having a phase difference, being characterized in that an error of the corresponding rotational detector can be detected by detecting whether or not either edge of upstroke or downstroke of the two kinds of pulse signals appears alternately.

In an error detecting unit according to the invention, it is determined whether or not either edge of upstroke or downstroke of the two kinds of pulse signals, outputted by a rotational detector, having phase difference and an equal frequency appears alternately. And an error of the rotational detector can be detected on the basis of the results of the determination.

Namely, in the case that the rotational detector encounters an error like a short circuit, etc., the above pulse signal is detected as remaining at a high or low level, and as the edges of each of the pulse signals does not appear alternately, it is possible to detect an error of the rotational detector without fail.

This specification hereof clearly points out the subject of the invention and ends with the claims clearly claimed hereafter. The ensuing description with reference to the drawings accompanied herewith is helpful to a better understanding.

DETAILED DESCRIPTION OF THE PREFERRED EMBODIMENTS

Figure 1:
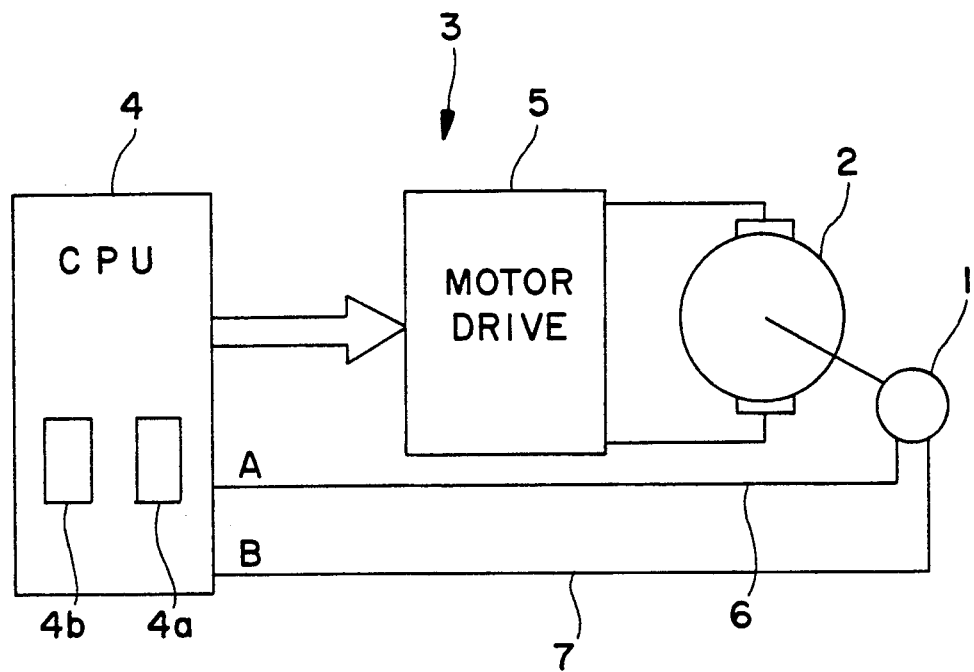
FIG. 1 is a block diagram showing an error detecting unit of rotational detector pertaining to one of the preferred embodiments of the invention.

As shown in FIG. 1, a rotational detector 1 comprising, for instance, an encoder, etc. is attached to a rotary body (for instance, a motor 2).

This rotational detector 1 outputs two kinds of pulse signals (A and B) having a phase difference, for instance 90 degrees, and equal frequency according to the rotation of the motor 2.

An error detecting unit 3 of this rotational detector 1 is mainly composed of a control section 4 consisting of a micro computer CPU (central processing unit) and counters 4a and 4b, etc.. A motor drive control circuit 5 and output lines 6, 7, etc. for transmitting two kinds of pulse signals A and B of the rotational detector 1 are connected to the control section 4.

Figure 4:
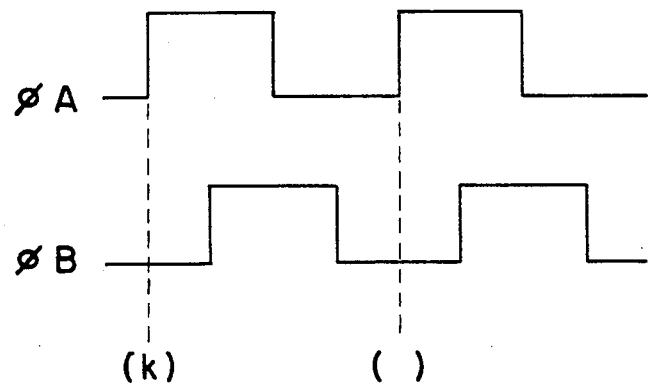
FIG. 4 is a time chart showing the output pulse signals A and B of the rotational detector when a motor rotates in the counterclockwise direction.
Figure 5:
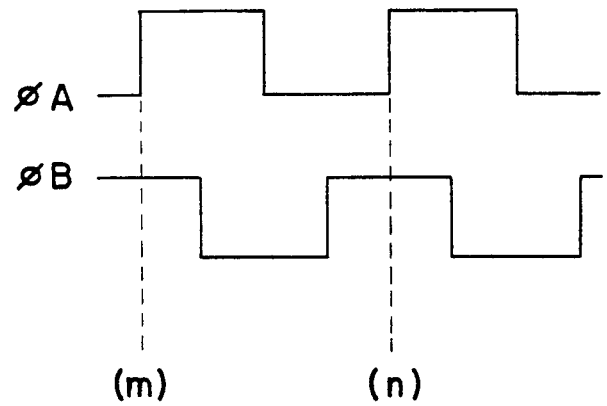
FIG. 5 is a time chart showing the output pulse signals A and B of the rotational detector when a motor rotates in the clockwise direction.
Figure 6:
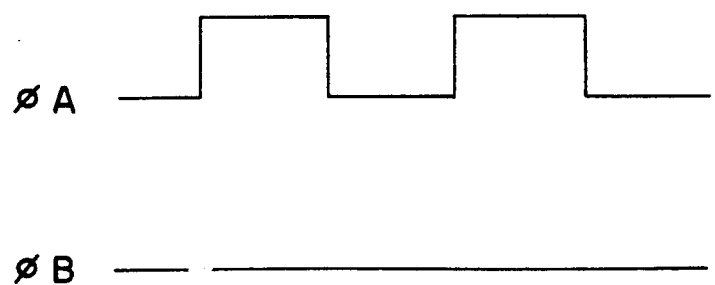
FIG. 6 is a time chart showing pulse signals A and B of an example showing that the rotational detector is out of order.

When the motor 2 rotates in the CCW direction or the CW direction, such pulse signals A and B as shown in the time charts of FIG. 4 and FIG. 5 are inputted in the control section 4 through the output lines 6 and 7, respectively.

And either edge of upstroke or downstroke between low level and high level of the pulse signals A and B can be detected by the control section 4. Furthermore, the control section 4 carries out processing for error detection for judging whether or not the above edge appears alternately with the counters 4a and 4b as described later and detects whether or not the rotational detector 1 is out of order. Subsequently, the ensuing description copes with the case that the above edge is an upstroke edge.

Figure 2:
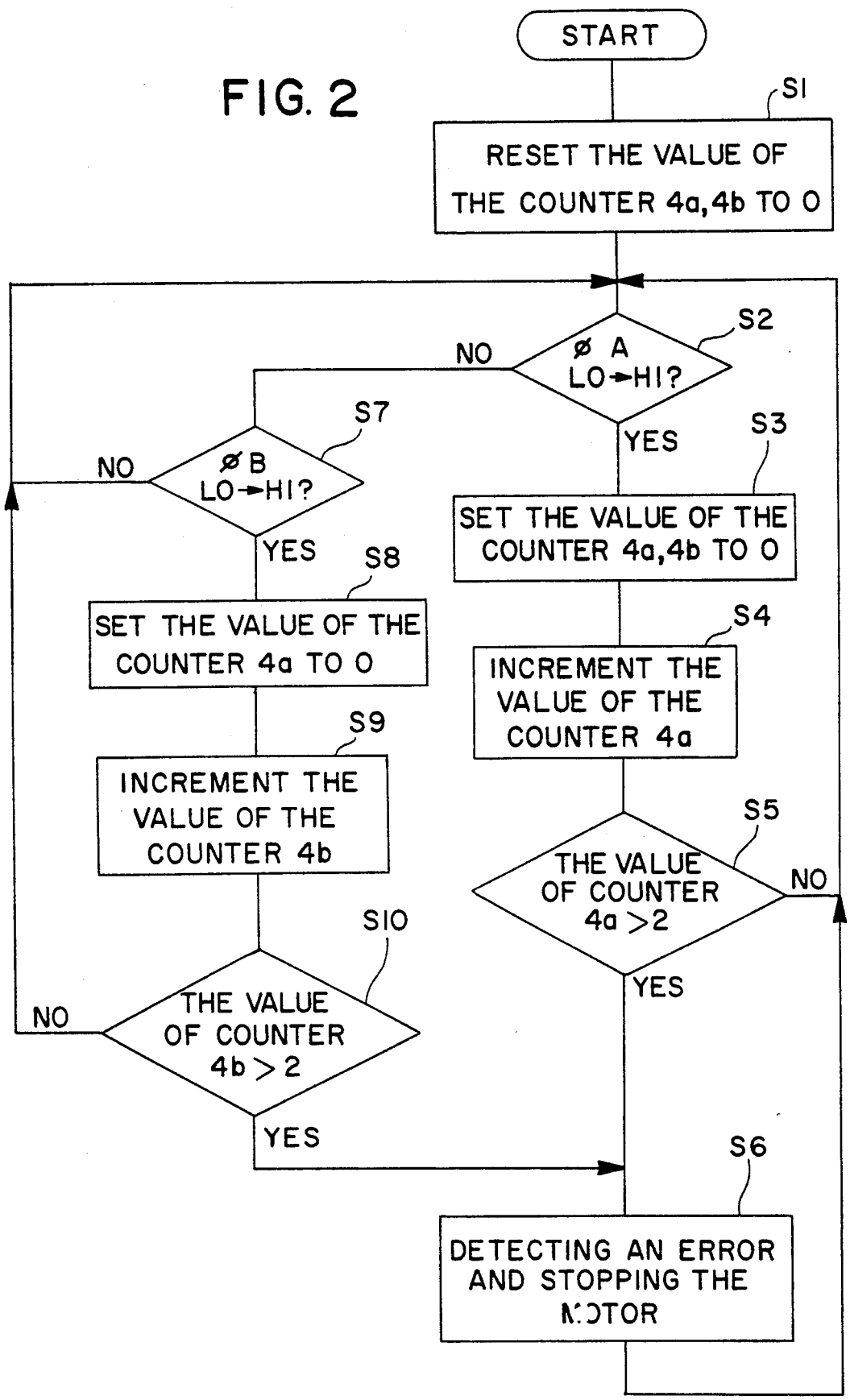
FIG. 2 is flow chart showing an example of processing of error detection by the error detecting unit.
Figure 3:
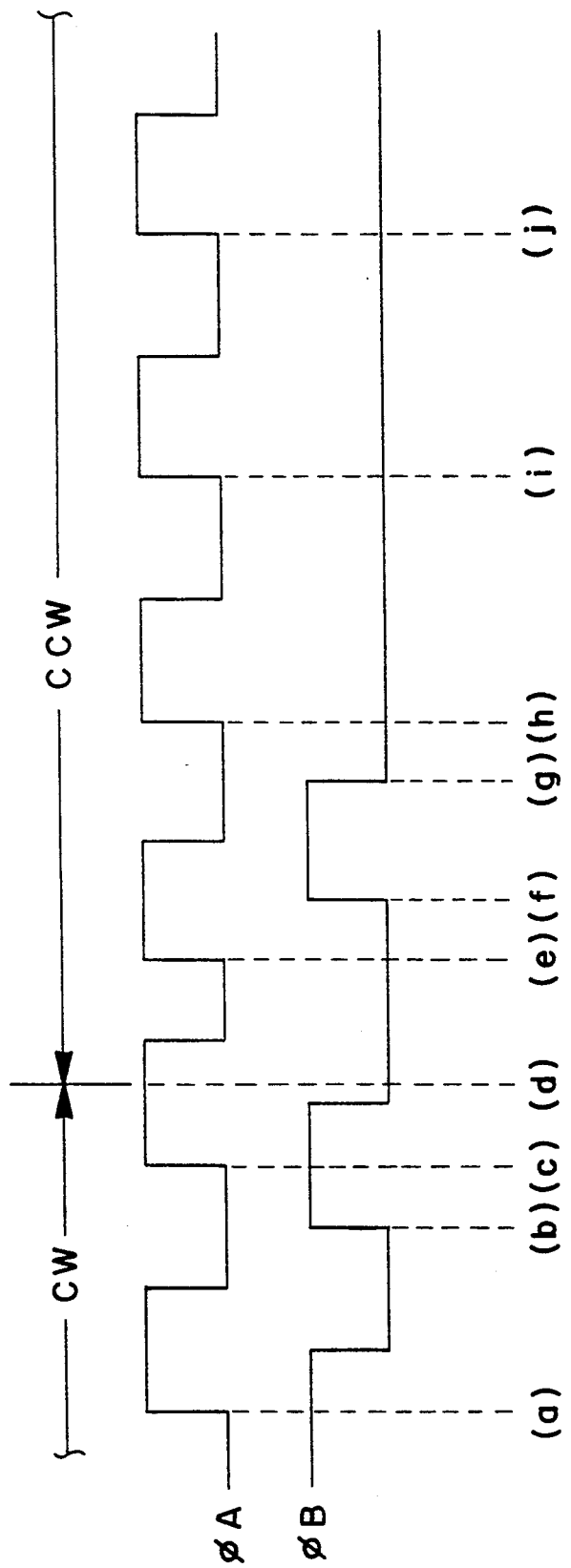
FIG. 3 is a time chart showing an example of output pulse signals of the rotational detector.

With reference to a flow chart of FIG. 2 and a time chart of FIG. 3, procedure of error detecting processing of the error detecting unit 3 of this rotational detector 1 is described in the sequence of step (S1), (S2), ..... Also, the processing procedure shown in FIG. 2 is prestored as program in a memory (not illustrated) of the control section 4.

Firstly, as the power of the error detecting unit 3 is switched on, the counter 4a and 4b are reset to zero (Step 1).

And, for instance, in the case that the motor 2 rotates in the CW direction, the upstroke edge of the pulse signal A outputted by the rotational detector 1 is detected by the control section 4 (Step S2, the time (a) in FIG. 3), and the counter 4b is reset to the value of zero (Step S3).

And the counter 4a starts counting (Step S4) and the count value of the counter 4a becomes 1.

Furthermore, it is then determined whether or not the count value of the counter 4a exceeds 2 of the value preset in the counter 4a (Step S5). At this time, as the count value of the counter 4a is 1 and does not exceed 2, it is then determined that the rotational detector 1 is normal, and the rotation of the motor 2 is continued as it is.

Consecutively, as the upstroke edge of the pulse signal B of rotational detector 1 is detected in accompanying with the rotation in the CW direction of the motor 2 (Step S2, S7, the time (b) in FIG. 3), the counter 4a of which count value has been 1 is reset to the value of zero (Step S8).

Namely, in the above steps S2 and S7, means for realizing a function to detect the upstroke edges of two kinds of pulse signals A and B by utilizing the control section 4 is signal edge detecting means.

Then, the counter 4b further goes on counting (Step S9) and the count value thereof becomes 1.

Furthermore, it is then judged whether or not the count value of the counter 4b exceeds 2 of the value preset in the counter 4b (Step S10). In this case, as the count value of the counter 4b does not exceed 2 as well as in the aforementioned counter 4a, the rotation of the motor 2 is continued as it is.

And as the upstroke edge of the pulse signal A is detected as well as aforementioned in accompanying with the rotation in the CW direction of the motor 2 (Step S2, the time (c) in FIG. 3), thereby the counter 4b of which count value has been 1 is reset to the value of zero (Step S3). Subsequently, the processing in the steps S4 and S5 is performed as well. The count value of the counter 4a becomes 1 again.

Namely, at each time when the pulse signal A or B makes upstroke from low level toward high level, the value of 1 is set in the counter 4a or 4b at the A side or B side of the pulse signals, and at the same time the counter 4b or 4a at the B side or A side of the pulse signal is cleared to be zero. Therefore, so far as the upstroke of the pulse signal A or B appears alternately, the value of the counter 4a, 4b at the A side or B side of the above pulse signal does not exceed 1 in either case, thereby causing the control section 4 to determined that the pulse signal A or B from the rotational detector 1 is normal.

On the other hand, as a command of the direction of rotation to reverse the present direction of rotation is issued to the motor 2 under such a circumstance, the motor 2 reversely rotates. And even though the pulse signal is normal in such a situation, there may be a case that the value of the counter 4a or 4b temporarily becomes 2.

Namely, as the direction of rotation of the motor 2, for instance, is reversed and it rotates in the CCW direction (the time (d) in FIG. 3), the upstroke edge of the pulse signal A is detected again consecutively to the last condition (S2, the time (e) in FIG. 3) and the processing in the steps S3 and S4 is performed as well as in the above description. In these cases, the count value of the counter 4a becomes 2.

And it is judged whether or not the count value of the counter 4a exceeds 2 (Step S5). In this case, as the count value does not exceed 2, the rotation of the motor 2 is continued as it is.

Moreover, as the upstroke edge of the output pulse signal B is detected as well as in the above description in accompanying with rotation of the motor 2 in the CCW direction (Step S2, S7, the time (f) in FIG. 3), the counter 4a is reset to the value of zero in the step S8. Then, the processing in the steps S9 and S10 is executed to thereby cause the rotation of the motor 2 to be continued.

As the upstroke edge of the output pulse signal A, B of the rotational detector 1 appears alternately (A, B, A, B or A, B, A, A, B, A, etc. in the case that the rotation is reversed from CW direction to CCW direction) in the case that the rotational detector 1 is normal as described in the above, the count value of the counter 4a (as well as for the counter 4b) does not exceed 2 (that is, it is reset to be zero in the step S8), and the rotation of the motor 2 is continued.

Here, it is supposed that a certain error (short circuit, breakage of wire, etc.) occurs in the rotational detector 1 and for instance the pulse signal B is continued as being on low level (the time (g) in FIG. 3).

Then, the upstroke edge of pulse signal A is detected in accompanying with the rotation of the motor 2 (Step S2, the time (h) in FIG. 3), and the processing in the steps S3, S4 and S5 are performed as well in the above description, thereby causing the count value of the counter 4a to become 1.

And even though the motor 2 is kept on rotating, the upstroke edge of the pulse signal B will not be detected, and the upstroke edge of the pulse signal A is detected consecutively to the last condition (the time (i), (j) in FIG. 3) and the processing in the steps S2, S3, S4, and S5 is repeated, thereby causing the counter 4a to go on counting and the count value of the counter 4a to be increased to 2 and 3 one after another.

In the step S5 after the count value of the counter 4a becomes 3, it is determined by the control section 4 that the count value exceeds 2, and it is determined that the rotational detector 1 is out of order (i.e., detection of an error). Here the motor 2 is stopped through the motor drive control circuit 5 by the control section 4 (Step S6).

Detecting an error in the above description is described in the case that the motor 2 rotates in the CCW direction. However, the way of detection is completely the same as above when the motor 2 rotates in the CW direction.

Namely, in the steps S3 through S5 or the steps S8 through S10, means for realizing a function for determining whether or not the detected upstroke edges of the two kinds of pulse signals A, B appear alternately is edge appearance condition judging means. And when it has been determining in the step S5 or S10 that the upstroke edges of pulse signals A, B do not appear alternately, the step S6 for realizing a function to determine that the rotational detector 1 is out of order is error judging means.

In the error detecting unit 3 as aforementioned, in the case that short circuit, breakage of wires, etc. which occupy a large part of the causes of error of the rotational detector 1 occur, the upstroke edges of the pulse signals A, B of the rotational detector 1 do not appear alternately and the count value of the counter 4a, 4b exceeds 2, thereby causing an error to be securely detected without fail.

Also, in the above embodiment, the value of 2 is preset in respective counters 4a, 4b for counting the upstroke edges of pulse signals A, B. However, the value which is preset in these counters 4a and 4b may be 1. Thereby an error of the rotational detector 1 can be more speedily detected than in the above case in which the value of 2 is set up in the counter 4a, 4b.

Actually however, such a composition as shown in the above is applicable only when the motor 2 rotates in either of the CW direction or the CCW direction. Hence, in the case that means for detecting the time of changing the direction of rotation of the motor 2 and for changing the value to be set in the counter 4a, 4b from 1 to 2 only when changing the direction of rotation is further provided, an error of the rotational detector 1 can be securely and quickly detected, regardless of the rotating conditions of the motor 2.

In the above embodiment, the upstroke edge of the pulse signals A, B outputted from the rotational detector 1 from low level to high level is detected, thereby causing an error of the rotational detector 1 to be detected according thereto. The downstroke edges from high level to low level may be utilized in place of the above upstroke edges.

The present invention can be embodied or effected in another example of the embodiment without departing from the spirit and substantial features thereof.

Therefore, the above embodiment is one of the preferred embodiments but is not limited to the above embodiment, and it will be apparent to those skilled in the art that various changes and modifications may be made therein without departing from the spirit and scope of the claims of the present invention as claimed.

What is claimed is:

1. An error detecting unit of a rotational detector for outputting two kinds of pulse signals whose frequency according to rotation is equal, having a phase difference, said unit comprising:

two counters responsive to either a rising or falling edge of the two kinds of pulse signals, one of said two counters for counting a number of pulses of one of the two kinds of pulse signals, and another of said two counters for counting a number of pulses of another of the two kinds of pulse signals, said unit characterized in that whenever either said one or said another of said two counters counts a pulse, the respective other of said one or said another of said two encounters is reset to zero, and when the count value of either of the above counters exceeds a value preset in respective counters it is determined that the rotational detector is out of order.

2. An error detecting unit of the rotational detector claimed in the claim 1, wherein the value preset in respective counters corresponding to the two kinds of pulse signals is 1.

3. An error detecting unit of the rotational detector claimed in the claim 1, wherein the value preset in respective counters corresponding to the two kinds of pulse signals is 2.

* * * * *

UNITED STATES PATENT AND TRADEMARK OFFICE
CERTIFICATE OF CORRECTION

PATENT NO. : 5,185,563
DATED : February 9, 1993
INVENTOR(S) : YASUMASA MATSUURA et al.

It is certified that error appears in the above-identified patent and that said Letters Patent is hereby corrected as shown below:

On the title page: Item [54] and Column 1, line 1,

Change "ERROR DETECTING UNIT FOR A ROTATIONAL DETECTOR" to --ERROR DETECTING UNIT OF A ROTATIONAL DETECTOR--

Item [73] Assignee: Add --Mita Industrial Co., Ltd., Osaka, Japan--

Signed and Sealed this

Eighth Day of February, 1994

Attest:

BRUCE LEHMAN

Attesting Officer

Commissioner of Patents and Trademarks